United States Patent
Kumar et al.

(10) Patent No.: US 9,798,539 B2
(45) Date of Patent: Oct. 24, 2017

(54) COMMENT LINKAGE AND DISPLAY ACROSS THE REVIEW CYCLE OF AN ARTIFACT

(71) Applicant: International Business Machines Corporation, Armonk, NY (US)

(72) Inventors: Atul Kumar, Gurgaon (IN); Deepa Saini, Gurgaon (IN); Siddharth K. Saraya, Raniganj (IN)

(73) Assignee: International Business Machines Corporation, Armonk, NY (US)

( * ) Notice: Subject to any disclaimer, the term of this patent is extended or adjusted under 35 U.S.C. 154(b) by 35 days.

(21) Appl. No.: 14/815,350

(22) Filed: Jul. 31, 2015

(65) Prior Publication Data
US 2017/0031677 A1    Feb. 2, 2017

(51) Int. Cl.
*G06F 9/44*  (2006.01)
*G06F 9/45*  (2006.01)
*G06F 11/36* (2006.01)

(52) U.S. Cl.
CPC .................. *G06F 8/71* (2013.01); *G06F 8/20* (2013.01); *G06F 8/73* (2013.01); *G06F 11/3668* (2013.01)

(58) Field of Classification Search
CPC .. G06F 8/20; G06F 8/71–8/78; G06F 11/3668
See application file for complete search history.

(56) References Cited

U.S. PATENT DOCUMENTS

| | | | | |
|---|---|---|---|---|
| 7,552,421 | B1* | 6/2009 | Raw | G06F 8/33 717/100 |
| 7,904,802 | B1* | 3/2011 | Kolawa | G06Q 10/06 705/300 |
| 7,945,589 | B1* | 5/2011 | Weiss | G06F 8/38 707/795 |
| 8,510,706 | B1* | 8/2013 | Bartlett | G06F 8/30 717/105 |
| 9,430,229 | B1* | 8/2016 | Van Zijst | G06F 8/71 |
| 2004/0261059 | A1* | 12/2004 | Spencer | G06F 8/71 717/120 |
| 2006/0236246 | A1 | 10/2006 | Bono et al. | |
| 2006/0236301 | A1* | 10/2006 | Minium | G06F 8/71 717/101 |
| 2007/0143744 | A1* | 6/2007 | Clemm | G06F 8/71 717/128 |
| 2007/0250810 | A1* | 10/2007 | Tittizer | G06F 8/73 717/110 |
| 2007/0288889 | A1* | 12/2007 | Harrison | G06F 8/73 717/110 |

(Continued)

OTHER PUBLICATIONS

Rebecca E. Grinter, Using a Configuration Management Tool to Coordinate Software Development, 1995, pp. 1-10.*

(Continued)

*Primary Examiner* — Thuy Dao
*Assistant Examiner* — Mongbao Nguyen
(74) *Attorney, Agent, or Firm* — Stephen R. Yoder (57) ABSTRACT

A record of comments made in previous artifact versions is displayed in the latest artifact version. Comment and reply chains are maintained in the latest artifact version, linking them with the artifact versions where they were introduced. The comment/reply history of an artifact, is viewable in a single latest version of the artifact.

20 Claims, 6 Drawing Sheets

(56) References Cited

U.S. PATENT DOCUMENTS

| | | | | |
|---|---|---|---|---|
| 2009/0055796 | A1* | 2/2009 | Springborn | G06F 8/20 717/102 |
| 2009/0210860 | A1* | 8/2009 | Sutherland | G06F 8/71 717/123 |
| 2009/0210861 | A1* | 8/2009 | Alupului | G06F 8/73 717/123 |
| 2010/0106705 | A1* | 4/2010 | Rush | G06F 8/36 707/709 |
| 2011/0113402 | A1* | 5/2011 | Ciano | G06F 8/10 717/104 |
| 2012/0324419 | A1* | 12/2012 | Roberts | G06Q 10/101 717/102 |
| 2013/0007709 | A1* | 1/2013 | Fan | G06F 8/71 717/121 |
| 2013/0174124 | A1* | 7/2013 | Watters | G06F 8/71 717/122 |
| 2013/0185700 | A1* | 7/2013 | Avrahami | G06F 8/73 717/120 |
| 2014/0033068 | A1 | 1/2014 | Gupta et al. | |
| 2014/0281872 | A1 | 9/2014 | Glover | |
| 2015/0135160 | A1* | 5/2015 | Gauvin | H04W 4/001 717/109 |
| 2015/0143327 | A1* | 5/2015 | Holmes | G06F 8/70 717/101 |
| 2015/0347284 | A1* | 12/2015 | Hey | G06F 11/3692 717/125 |
| 2016/0162263 | A1* | 6/2016 | Brunswig | G06F 8/71 717/101 |

OTHER PUBLICATIONS

Steven Arnold, Learner Software Development Using Devops, 2014, pp. 1-25.*

Hidetake Uwano, Analyzing Individual Performance of Source code review using reviewers' eye movement, 2006, pp. 1-8.*

"The change proposal system"; IBM Knowledge Center; Printed May 1, 2015; p. 1; <http://www-01.ibm.com/support/knowledgecenter/SSYQBZ_9.5.2/com.ibm.doors.administering.doc/topics/c_aboutchangeproposalsystem.html>.

"Issue Tracking"; Review Board; Printed May 1, 2015; pp. 1-2; <https://www.reviewboard.org/docs/manual/dev/users/reviews/issue-tracking/#issue-tracking>.

"Rational DOORS v9 x: Requirements Change Management Options"; IBM User Education; YouTube; Nov. 5, 2013; <https://www.youtube.com/watch?v=k0ukq7X1sQo>.

"Replying to Comments"; Review Board; Printed May 1, 2015; p. 1; <https://www.reviewboard.org/docs/manual/dev/users/reviews/replying/#review-replying>.

"Review Board"; Printed May 1, 2015; pp. 1-3; <https://www.reviewboard.org/>.

"Review UI"; Printed May 1, 2015; pp. 1-31; <https://gerrit-documentation.storage.googleapis.com/Documentation/2.9.1/user-review-ui.html>.

"Reviewing Diffs"; Review Board; Printed May 1, 2015; pp. 1-5; <https://www.reviewboard.org/docs/manual/dev/users/reviews/reviewing-diffs/#reviewing-diffs>.

* cited by examiner

```
VERSION 2                                           ┌─ 400

410   RUN PROGRAM 1      [CORRECTED, THANKS:[C1V1]]
  415   ABC
  420   XYZ
  425   123
```

FIG. 4A

```
VERSION 1                                           ┌─ 450

410'  RUN PORGRAM 1      [CHANGE TO "RUN PROGRAM 1"]
  425'  ABC
  420'  XYZ
  425'  123
```

FIG. 4B

ARTIFACT A1

1. init a = 2      [C1: MOVE INIT a TO AFTER INIT b]
2. init b = 3
3. init c = a+b
4.
5. #TEST COMMENT [C2: WRITE MORE EXPLICIT COMMENTS]

FIG. 5

ARTIFACT A2

1. init a = 2
2. init b = 3
3. init c = a+b
4.
5. #THIS IS COMMENT FOR ADDITION   [R2: MODIFIED THE COMMENT]
6. d = axb                                          [C3: INITIALIZE D]

COMMENT LINKAGE AND DISPLAY ACROSS THE REVIEW CYCLE OF AN ARTIFACT

BACKGROUND

The present invention relates generally to the field of software development, and more particularly to tracking comments and/or revisions during a review process.

An artifact is one of many kinds of tangible by-products produced during the development of software. The term "artifact" in connection with software development is generally associated with specific development methods or processes. An artifact in the unified modeling language (UML) is the specification of a physical piece of information that is used or produced by a software development process, or by the deployment and operation of a system. Examples of artifacts include model files, source files, scripts, binary executable files, tables in a database system, development deliverables, word-processing documents, and email messages.

State of the art review tools tie the review comments and their replies to the artifacts under review. In that way, there are solutions available that present all the versions of the artifact under review so a user can see the previous version of the artifact and review its comments.

SUMMARY

In one aspect of the present invention, a method, a computer program product, and a system includes: recording a first notation in a first version of an artifact, recording a second notation, responsive to the first notation, in a second version of the artifact, and generating a notation trail such that the first version is viewable at the second notation of the second version.

DETAILED DESCRIPTION

A record of comments made in previous artifact versions is displayed in the latest artifact version. Comment and reply chains are maintained in the latest artifact version, linking them with the artifact versions where they were introduced. The comment/reply history of an artifact, is viewable in a single latest version of the artifact. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

Figure 1:
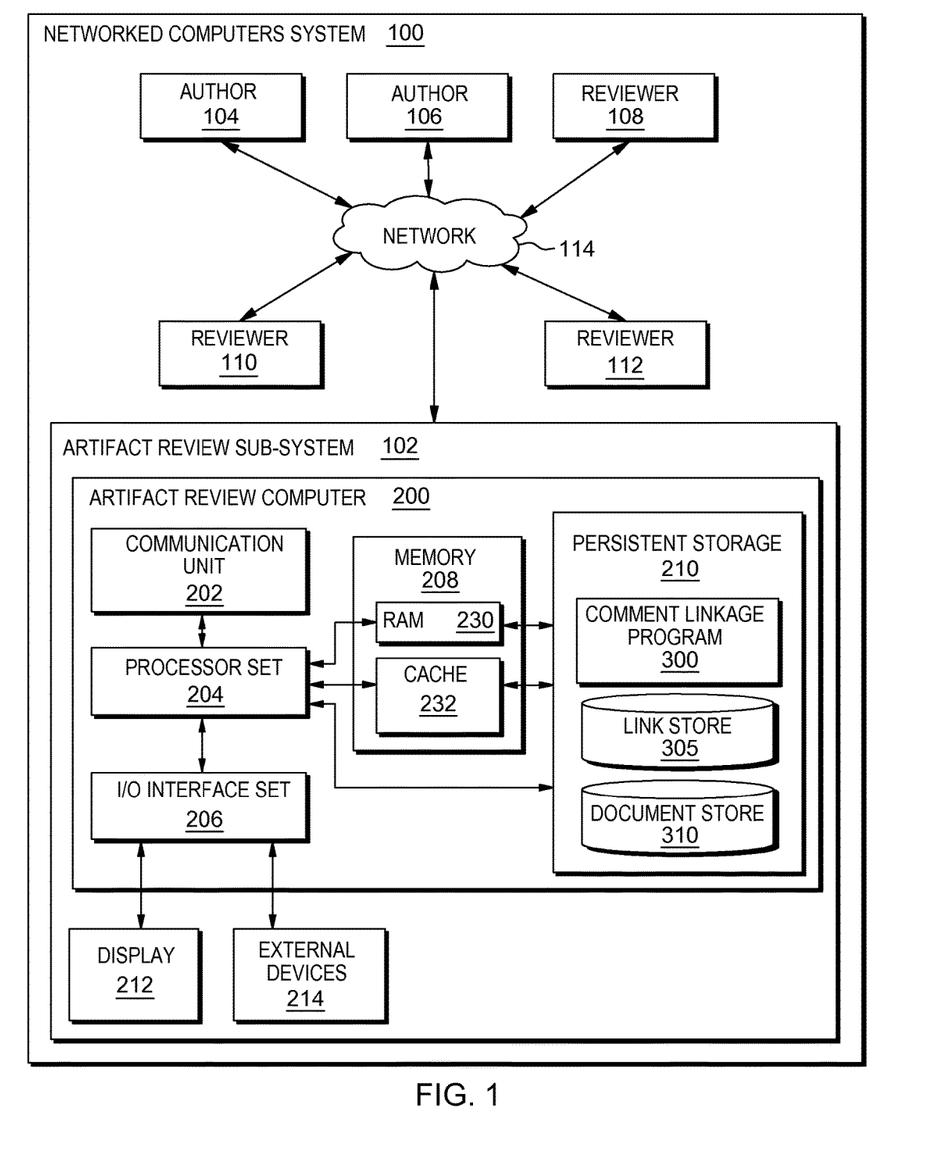
FIG. 1 is a schematic view of a first embodiment of a system according to the present invention.

The present invention will now be described in detail with reference to the Figures. FIG. 1 is a functional block diagram illustrating various portions of networked computers system 100, in accordance with one embodiment of the present invention, including: artifact review sub-system 102; author sub-systems 104, 106; reviewer sub-systems 108, 110, 112; communication network 114; artifact review computer 200; communication unit 202; processor set 204; input/output (I/O) interface set 206; memory device 208; persistent storage device 210; display device 212; external device set 214; random access memory (RAM) devices 230; cache memory device 232; comment linkage program 300; link store 305, and document store 310.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Figure 3:
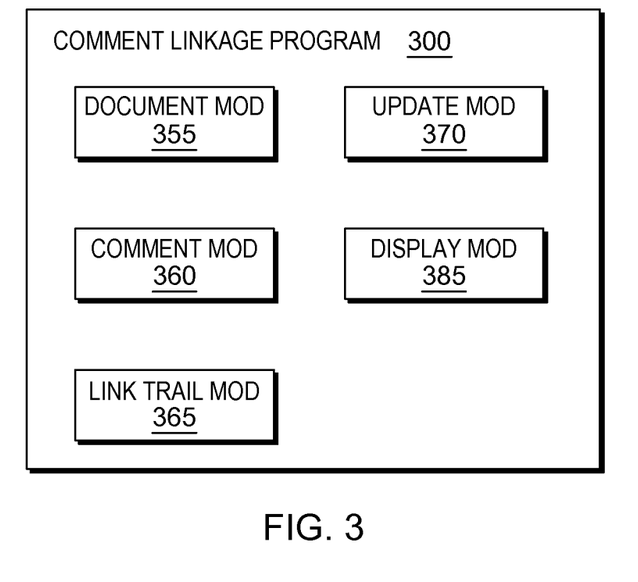
FIG. 3 is a schematic view of a machine logic (for example, software) portion of the first embodiment system.

Comment linkage program 300 operates to maintain a comment chain, or trail, and linkages between the individual comments/replies in the comment chain and corresponding artifact versions. In that way, a linked trail is available to support understanding of the various revisions made to an artifact from one version to a subsequent version. The two artifact versions do not need to be sequential versions.

Some embodiments of the present invention recognize the following facts, potential problems and/or potential areas for improvement with respect to the current state of the art: (i) whenever a new version of the artifact is uploaded, the previous comments remain with the previous version of the same document; (ii) whenever a new version of an artifact is uploaded, the comments made in the previous version of the artifact are not available for replying to in the new version of the artifact; (iii) the author or reviewer must continually switch between the context of comments in one version of the artifact to editing another version; (iv) when reviewing comments, users are likely to miss important comments while switching from a previous version of the artifact to the new version; (v) when reviewing comments, users are likely to miss important comments while verifying the latest uploaded document; (vi) users are likely to make duplicate comments because the comment is only visible in a previous version; and/or (vii) users are not able to reply directly to any previous reply to comments or an original comment made in a previous version of the artifact.

Some embodiments of the present invention are directed to linking a comment/reply trail with the version of the artifact in which the individual comments/replies of the comment/reply trail were made, thus providing flexibility to the user for seeing the comment history and the impacted versions in the artifact history.

Figure 2:
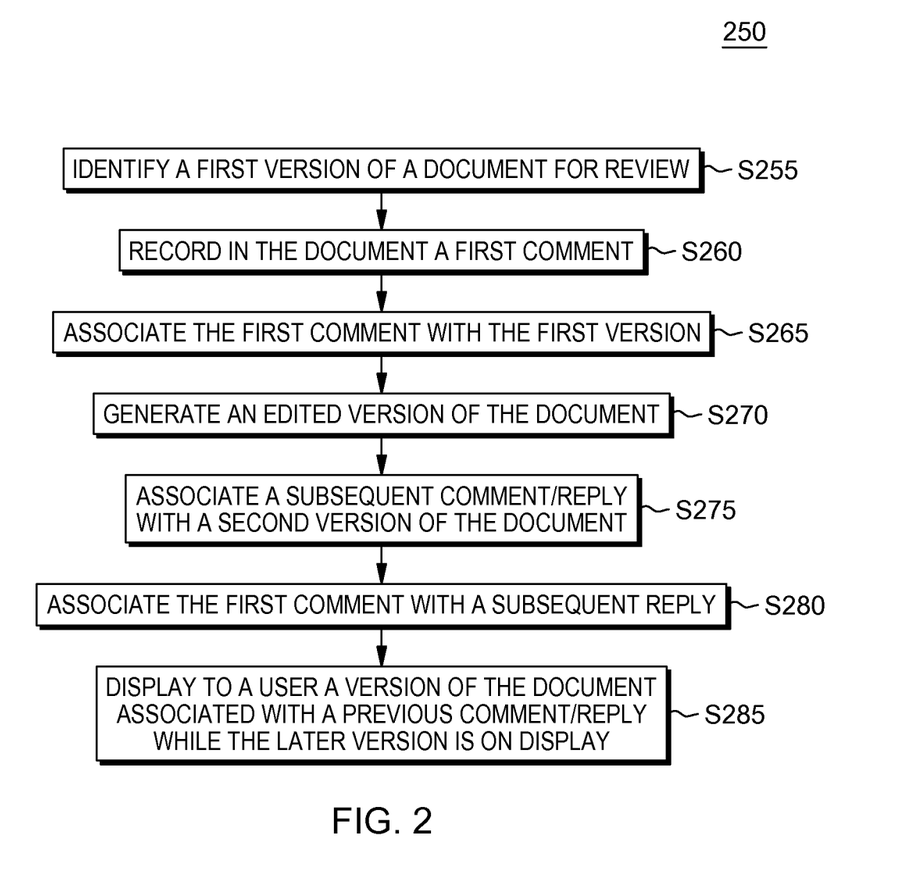
FIG. 2 is a flowchart showing a method performed, at least in part, by the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where document module ("mod") 355 identifies a first version of a document for review. In this example, reviewer 108 (FIG. 1) selects identified first version from document store 310 (FIG. 1) for review. In this example, the first version has not previously been reviewed by a reviewer. Alternatively, upon opening a program editor (not shown), a latest version of a most recent program from document store 310 (FIG. 1) is identified as a first version of the document for review automatically by document mod 355. Alternatively, a document that is identified as the first version by the document mod is stored in persistent memory of a dedicated terminal (not shown) for reviewing/editing stored documents. Regardless of the manner of identification, the document to be reviewed and/or edited by a user is identified as the first version by the document mod. It should be noted that the term "first version" as used in this example process does not necessarily mean the first in a series of versions or an original version, but simply indicates a first version, which is later modified as a second version for purposes of illustration of this example. Also, this example discussion presents a document and its versions, while some embodiment of the present invention apply to other artifacts generated during software development where a reviewer and author exchange one or more comments/replies.

Processing proceeds to step S260, where comment mod 360 records in the document a first comment made by a reviewer. In this example, reviewer 108 enters a first comment to be recorded in the document identified in step S255. For a document having existing revisions and/or comments, the recorded first comment may be a reply to a previous comment or reply, or may be a new comment chain for the identified document.

Processing proceeds to step S265, where link trail mod 365 associates the first comment recorded in step S260 with the first version (identified in step S255) of the document in a structured database. In this example, the first comment is recorded as being linked to the first version in link store 305. For each comment made in the document under review, the version in which the comment is made is associated with the comment in the link store. In this simple example, editing the document by an author results in the generation of a new version, while entering a comment by a reviewer merely results in the recording of a comment in the same version being reviewed. In some embodiments of the present invention, a new version is generated each time a reviewer or author completes a period of reviewing and/or editing. The principle practiced herein is that when a comment or reply is made, the comment or reply is associated with the version that is being edited, whether the version is based on the entering of the comment or based on the last substantive edit of the document.

Processing proceeds to step S270, where update mod 370 generates an edited version of the document. In this example, an editor, such as author 104 (FIG. 1) edits the document in response to the first comment, which is then stored as a different version that represents the edited document. The edited version includes the first comment and its association with the first version.

Processing proceeds to step S275, where link trail mod 365 associates a subsequent comment and/or reply with a second version of the document. When a second version is generated, the comment and/or reply that necessitated the generation of the second version is associated with the second version. The second version generated in this step is generated upon entry of a first reply to the first comment. That is, a first reply is recorded in the edited version generated in step S270, which is then identified as the second version for purposes of this example. Alternatively, the edited version is an intermediate version that is distinct from the second version, which is generated upon entry of the first reply to the first comment. Alternatively, a second version is generated upon entry of a new comment recorded during a subsequent review session.

Processing proceeds to step S280, where link trail mod 365 associates the first comment with a subsequent reply in a structured database. In this example, the first comment is associated with the first reply in link store 305 (FIG. 1). Intervening versions may exist where the first comment does not receive the first reply. By linking the first comment with the first reply, whenever it is made, the first version, which is associated with the first comment in step S265, is associated with the version of the document where the first reply is made. In this example, the first version is associated with the second version. As shown in the screenshots that follow, a link is provided in the second version at the line of text where the reply is made that opens the first version at the same line of text, which is where the first comment was made. Alternatively, and as described in further detail below, the line of text in the associated version is displayed in the version being viewed. In some embodiments, the line of text is presented upon receipt of a mouse click, or by hovering over the text of the version being viewed. Alternatively, the whole document is viewable from the associated line of text in the version being viewed.

Processing proceeds to step S285, where display mod 385 displays to a user a version of the document, associated with a previous comment/reply, while the later version is on display. As shown in the screenshots that follow, a link is provided in the second version at the line of text where the reply is made that opens the first version at the same line of text, which is where the first comment was made. Alternatively, and as described in further detail below, the line of text in the associated version is displayed in the version being viewed. In some embodiments, the line of text is presented upon receipt of a mouse click, or by hovering over the text of the version being viewed. Alternatively, the whole document is viewable from the associated line of text in the version being viewed. Generally, user action that identifies the comment and/or reply being viewed results in the associated version of the document being made viewable by the display mod.

Figure 4A:
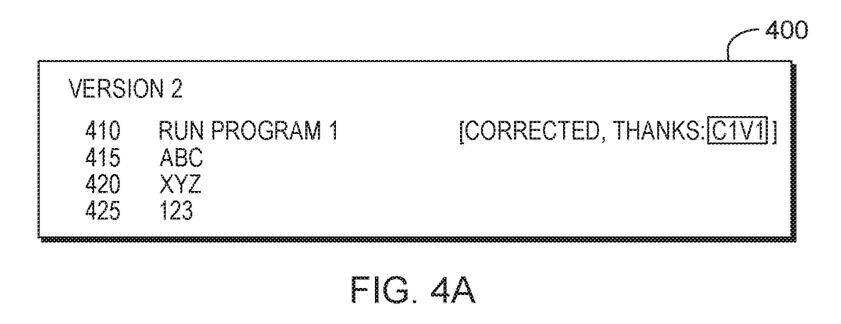
FIGS. 4A and 4B are screenshot views generated by the first embodiment system.
Figure 4B:
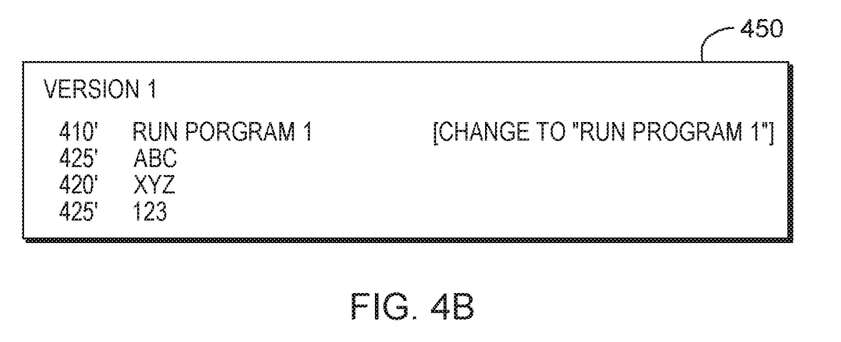

FIGS. 4A and 4B are screenshots illustration the operation of one embodiment of the present invention. Screenshot 400 shows Version 2 of an identified document along with text lines 410, 415, 420, and 425. Text line 410 includes a reply "corrected, thanks!" and a link [C1V1], which indicates comment 1 of Version 1 of the identified document. When the link is selected by a user, screenshot 450 pops up to present Version 1 of the identified document where text lines 410', 415', 420', and 425' are shown. Text line 410' shows comment "change to Run Program 1." In this simple example, it is illustrated how a reviewer is able to see how an earlier text line was written and what was commented regarding the text line. In that way a reviewer may reconsider a change that was made. Also, a reviewer may avoid a repetitive cycle of making the same changes and/or comments to a particular line. The advantage of such functionality becomes more apparent where the author does not make the change recommended by the reviewer and a subsequent reviewer wishes to make a similar comment.

Further embodiments of the present invention are discussed in the paragraphs that follow and later with reference to FIGS. 5-10.

Comment attributes include: (i) text; (ii) insertion location of the comment; (iii) type of comment; (iv) disposition of the comment; (v) creator of the comment; (vi) creation time of the comment; and/or (vii) other comment attributes. Similarly, reply attributes include: (i) responsive to the addition of text; (ii) responsive to modification of an insertion point; (iii) type of reply; (iv) disposition of the reply; (v) creator of the reply; (vi) creation time of the reply; and/or (vii) other reply attributes.

In one example process, according to some embodiments of the present invention, a first version of a file artifact is opened by a reviewer for review. In this example, the file artifact is opened with a review tool. The reviewer records a comment in the first version of the file artifact. The author of the file responds to the comment from the reviewer by making appropriate changes to generate a second version of the file artifact. The author, upon making the changes, replies to the comment from the reviewer of the first version and uploads the second version of the artifact for further review. The reviewer then reviews the second version of the file artifact, adding new comments and a reply to the existing comment/reply chain originating with the first version. Again, the author considers the new comments and the additional reply in the comment/reply chain. As can be seen in this example, each latest version of the file artifact includes a viewable history of the comments made during review.

In some embodiments of the present invention, the reviewer closes the review comments when the necessary changes in the file artifact are complete. This closing activity, does not necessarily close the comments in a same version of the file artifact, but they are closed, in some embodiments, over the review cycle, which spans across multiple versions of the file artifact under review. When a reviewer closes comments for a particular concern with a file artifact, a user has a choice to see each of the comments made during review or just the "active" comments, or those comments not yet closed.

Another example process according to some embodiments of the present invention is as follows. An author uploads a program for review (the artifact) and requests a review of the program by a reviewer. The program for review is saved in a review database as a first version of that program. If the program for review is saved on a different tool than is used for reviewing, then a reference to the program is saved with an indication of its version number.

The reviewer begins the review of the first version of the program stored in the review database. During the review, the reviewer selects a specific location or line of code to insert a new comment according to the capability and available tools of the review tool. Upon inserting one or more comments at selected locations, each portion of comment text, the locations of insertion, and file version on which the comments were inserted is recorded in the review database.

When the author views the comments made by the reviewer, he makes changes in the program under review according to some comments and, for other comments, he chooses to reply to the comment(s) to learn of more details or to defer addressing the comment at this time. All the replies and status changes are recorded in the review database. Additionally, replies are linked to the corresponding comments and the version of the program on which the comments and/or replies were made. These linkages are recorded in the review database. Once the changes are completed for the single review round, the author uploads a new version of the program, the second version of the program under review. The second version of the program is stored in the review database as a next version of the first version.

The reviewer then reviews the second version, adds new comments, replies to some previous replies from the author, and closes some comments. The author again takes action, by revising the second version of the program under review and replies to the reviewer's comments. The revised second version is stored in the review database as a third version of the program under review along with recorded links as described above with respect to the second version. The third version of the program is posted for further review. This review/revision cycle continues until the comments are each closed or until a mutual consent is reached to end the process and to defer or simply not to fix the program according to some comments. For comments directed to text at a particular location within an artifact, if the text is moved to another location, or if the text no longer exists, the comment is prompted to the user at the original location of the latest version of the artifact. The user is responsible for moving the comment, as-required, or mark it as a generic comment, which causes the comment to be displayed at the artifact level for the latest version.

Some embodiments of the present invention are directed to allowing a user to view comments for various earlier versions of an artifact at a single latest version of that artifact, or at a latest artifact level. Additionally, in some embodiments of the present invention, the user elects just to view the active comments. In that way, a reviewer is able to view a "clean plate" while reviewing and/or closing active comments and, as-desired, view other comments, which were recorded, but closed in an earlier version of the artifact.

Some embodiments of the present invention provide for a user to directly reopen a previous comment by viewing comment history in the latest version of an artifact. In some embodiments, both the author and the reviewer reply directly in the latest artifact version to comments and/or replies made in previous artifact versions. If any text is moved from a location in one file to another file or deleted from a location in a file due to a reviewer's comment, the reason for moving or deleting the file can, in some cases, be determined by checking the comment insertion points in one, or both of the file versions to see what comments were made.

According to some embodiments of the present invention, if, in order to address a comment, the location, or line, on which the comment was made is deleted, or the text has been moved up or down from the original location, the comment along with its linked replies are shown at the deleted location of the latest version of the file. In such cases the comment is valid, but the location to where it is pointing is invalid. The reviewer and/or author is permitted to redirect the comment and linked replies to a correct location in the latest artifact version. For example, the author may move the comment chain to a new location within the artifact or map the comment chain to the artifact as a generic comment. Further, the location change is recorded at the latest version and any subsequent versions created at a later time. But for the lower versions, the location integrity of the comments is maintained.

In some embodiments of the present invention, the location of the comment is changed by changing the insertion point manually. Alternatively, the location of the comment is changed by dragging the comment to the new location where it should point too. The comment along with all its linked replies is a "complete comment" that has a collective status as open, active, in-progress, being fixed, closed, or deferred. In some embodiments, the users set the collective status of the complete comment according to pre-defined policy, or otherwise as agreed upon by participants. The status change is recorded in the review database.

Some embodiments of the present invention are directed to providing a query for users to fetch from the review database all comments or just the comments having a particular set of status values, such as all comments having an open or in-progress status. Based on the result the comments are displayed at the location they were inserted.

Each comment or reply includes a link to the artifact version on which it was made. In some embodiments of the present invention, the artifact version is fetched from the review database as it was stored with the comment chain. In some examples, the particular artifact version is provided to the user as a link. In that way, the user is able to use the link to open that version of the artifact as-needed.

If a reviewer chooses to remove a comment, or comment chain, from any location in a particular version of an artifact, the comment would not be visible in that particular version or future versions, but would be available in a version previous to the particular version.

Some embodiments of the present invention go beyond merely providing a mechanism to propose changes and track them in a current requirements module, by showing change requests received in earlier version(s) of the requirements module by linking change requests across requirements versions. In that way, the integrity of the comment-to-artifact-version relationship is maintained and a flexibility is created for viewing comments from various versions of a given artifact in the latest version of the artifact.

In some embodiments of the present invention, the comments are displayed at the latest version of the artifact, but still they are tied to the version of the artifact on which they were created. On reviewing the artifact, reviewer is aware of the previous comments and can track them to closure.

Referring now, to FIGS. 5-10, a simple example set of text lines are subject to a review/reply process according to some embodiments of the present invention.

Figure 5:
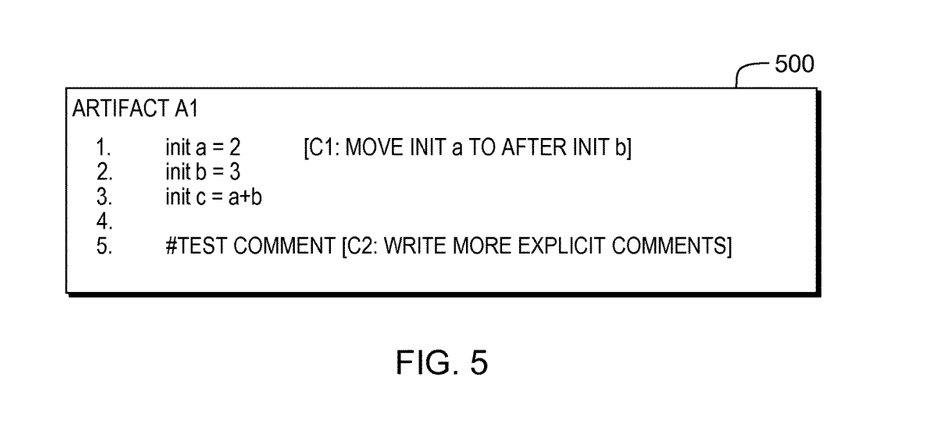
FIG. 5 is a first program code snippet showing information that is generated by and/or helpful in understanding embodiments of the present invention.

FIG. 5 shows Artifact 500, shown as version A1, having the simple initial state as shown for purposes of this example. During a first review of version A1, the reviewer has entered two comments. Comment C1 is at line 1, and states, "move initialization after b's initialization." Comment C2 refers to the text "# test comment" at line 5 of the artifact, stating "write more explicit comments."

Figure 6:
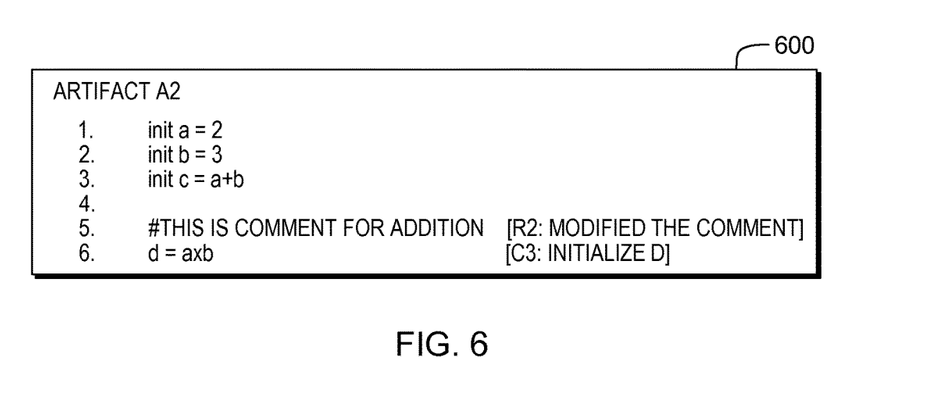
FIG. 6 is a second program code snippet showing information that is generated by and/or helpful in understanding embodiments of the present invention.

FIG. 6 shows Artifact 600, shown as version A2, which is the uploaded revision of version A1. In this revision, Comment C1 was not followed during revision of A1, so the text in lines 1 and 2 are not switched. Comment C2 prompted a change by the author, so line 5 now reads, "#this is comment for addition." C2 prompted reply R2 "modified the comment" from the author during revision of version A1. Reply R2 is recorded in review repository as having a relationship with artifact version A2 and a relationship with comment C2. Further, version A2 of the artifact includes new code added at line 6. Upon review of version A2, the reviewer added Comment C3 directed to line 6, "initialize d." Comment C3 is recorded as having a relationship with version A2, where it was first posted.

Figure 7:
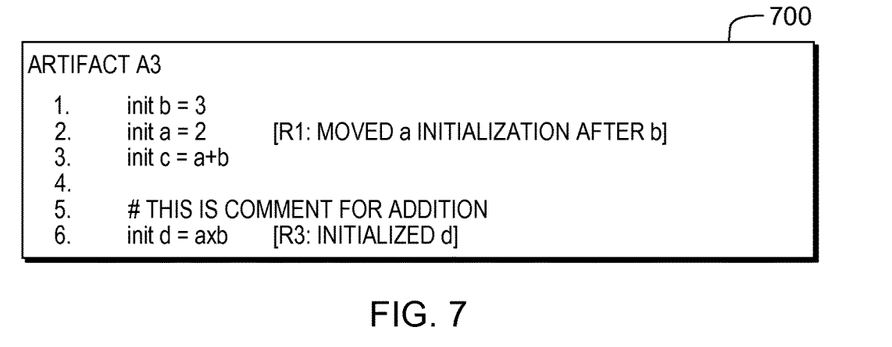
FIG. 7 is a third program code snippet showing information that is generated by and/or helpful in understanding embodiments of the present invention.

FIG. 7 shows Artifact 700, shown as version A3, which is the uploaded revision of version A2. In version A3, Comment C1, related to version A1, was addressed by switching original text from lines 1 and 2. Reply R1 confirms the switch according to Comment C1. Also, line 6 is revised in version A3 according to Comment C3, from version A2. Reply R3 confirms the revision according to Comment C1, "initialized d." It should be noted that the Reply R1 pointer is changed to the new location, line 2, in accordance with the switch that was made.

Figure 8:
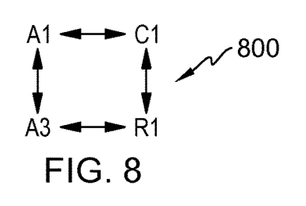
FIG. 8 is a first linkage diagram showing information that is generated by and/or helpful in understanding embodiments of the present invention.
Figure 9:
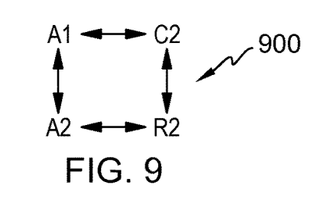
FIG. 9 is a second linkage diagram showing information that is generated by and/or helpful in understanding embodiments of the present invention.
Figure 10:
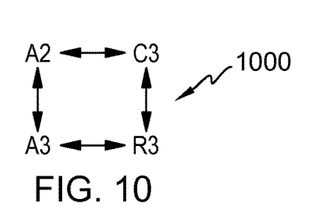
FIG. 10 is a third linkage diagram showing information that is generated by and/or helpful in understanding embodiments of the present invention.

FIGS. 8-10 illustrate the linkages 800, 900, and 1000 respectively that are developed over the three versions of the example artifact, A1, A2, and A3. According to linkage 800, comment C1 of version A1 was resolved according to Reply R1 in version A3. This creates a link between version A3 and version A1, such that, in some embodiments of the present invention, a selectable link is made available in version A3 for a user to view version A1 as-needed when reviewing Artifact.

Similarly, linkage 900 shows that comment C2 of version A1 was resolved according to Reply R2 in version A2, creating a relationship between versions A1 and A2 where Comment C2 is responded to by Reply R2. Further, in FIG. 10, linkage 1000 shows that comment C3 of version A2 drives the change reflected in Reply R3 of version A3. By recording relationships in a comment trail and corresponding artifact versions, a use is able to understand how the comment and reply history is responsible for the latest artifact version.

Some embodiments of the present invention may include one, or more, of the following features, characteristics and/or advantages: (i) review comments map with the complete review cycle of the artifact and not just with only a version review of the artifact; (ii) upon reviewing the artifact, a reviewer is aware of the previous comments and can track them to closure (it leaves no scope of the reviewer missing the previous comments that were already made); (iii) a reviewer sees any previous comments and subsequent replies, thus reducing duplicate comments during various review phases; (iv) no need to switch between previous versions of an artifact to view the previous comments made during review; (v) comments are tied, or linked, to the version of the artifact on which they were created; (vi) allows a reviewer to view old comments, which avoids re-submitting closed comments; and/or (vii) a user does not have to re-draft previously closed comments in order to "re-open" them.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method performed by computer software running on computer hardware comprising:
    recording a first notation in a first version of an artifact at a line of text in the artifact;
    associating, in a structured database, the first notation with the first version and with the line of text;
    responsive to the line of text being edited and saved as a revised line of text, generating a second version of the artifact;
    recording a second notation in the second version of the artifact at the revised line of text;
    associating, in the structured database, the second notation with the second version and with the revised line of text;
    associating, in the structured database, a third notation with a third version of the artifact and with an original line of text, the original line of text being generated in an original version and being edited in the first version as the line of text, the original line of text and the line of text are individually selectably viewable within the third version of the artifact; and
    displaying the line of text, as stored in the first version at the second notation in the second version including the revised line of text, and the original line of text, as stored in the original version at the third notation in the third version, at the revised line of text;

wherein:
the first notation is distinct from the second notation;
the first notation is related to the second notation in a comment chain; and
the original line of text and the line of text are individually selectably viewable within the second version.

2. The method of claim 1, further comprising:
associating the second notation with the first notation by a selectable link to the structured database proximate the revised line of text, the selectable link providing for access to at least the first notation and the line of text in the first version.

3. The method of claim 2, wherein:
the displaying the line of text is responsive to selection of the selectable link.

4. The method of claim 1, further comprising:
generating a notation trail for the second version linked to the structured database; and
wherein:
the first version is selectably viewable within the second version.

5. The method of claim 1, wherein the artifact is a binary executable file in a unified modeling language.

6. The method of claim 1, wherein:
the first notation is a comment directed to the line of text in the artifact; and
the second notation is a reply directed to the comment.

7. The method of claim 1, wherein the artifact is a physical piece of information that is used and/or produced by one of a software development process, a deployment of a system, and an operation of a system.

8. A computer program product comprising a computer readable storage medium having stored thereon:
first program instructions programmed to record a first notation in a first version of an artifact at a line of text in the artifact;
second program instructions programmed to associate, in a structured database, associating, in a structured database, the first notation with the first version and with the line of text;
third program instructions programmed to, responsive to the line of text being edited and saved as a revised line of text, generate a second version of the artifact;
fourth program instructions programmed to record a second notation in the second version of the artifact at the revised line of text;
fifth program instructions programmed to associate, in the structured database, the second notation with the second version and with the revised line of text;
sixth program instructions programmed to associate, in the structured database, a third notation with a third version of the artifact and with an original line of text, the original line of text being generated in an original version and being edited in the first version as the line of text, the original line of text and the line of text are individually selectably viewable within the third version of the artifact; and
seventh program instructions programmed to display the line of text, as stored in the first version at the second notation in the second version including the revised line of text, and the original line of text, as stored in the original version at the third notation in the third version, at the revised line of text;
wherein:
the first notation is distinct from the second notation;
the first notation is related to the second notation in a comment chain; and
the original line of text and the line of text are individually selectably viewable within the second version.

9. The computer program product of claim 8, wherein the storage medium has further stored thereon:
eighth program instructions programmed to associate the second notation with the first notation by a selectable link to the structured database proximate the revised line of text, the selectable link providing for access to at least the first notation and the line of text in the first version.

10. The computer program product of claim 9, wherein:
displaying the line of text is performed responsive to selection of the selectable link.

11. The computer program product of claim 8, wherein the storage medium has further stored thereon:
eighth program instructions programmed to generate a notation trail for the second version linked to the structured database; and
wherein the first version is selectably viewable within the second version.

12. The computer program product of claim 8, wherein the artifact is a binary executable file in a unified modeling language.

13. The computer program product of claim 8, wherein the artifact is a physical piece of information that is used and/or produced by one of a software development process, a deployment of a system, and an operation of a system.

14. The computer program product of claim 8, wherein:
the first notation is a comment directed to the line of text in the artifact; and
the second notation is a reply directed to the comment.

15. A computer system comprising:
a processor set; and
a computer readable storage medium;
wherein:
the processor set is structured, located, connected, and/or programmed to run program instructions stored on the computer readable storage medium; and
the program instructions include:
first program instructions programmed to record a first notation in a first version of an artifact at a line of text in the artifact;
second program instructions programmed to associate, in a structured database, associating, in a structured database, the first notation with the first version and with the line of text;
third program instructions programmed to, responsive to the line of text being edited and saved as a revised line of text, generate a second version of the artifact;
fourth program instructions programmed to record a second notation in the second version of the artifact at the revised line of text;
fifth program instructions programmed to associate, in the structured database, the second notation with the second version and with the revised line of text;
sixth program instructions programmed to associate, in the structured database, a third notation with a third version of the artifact and with an original line of text, the original line of text being generated in an original version and being edited in the first version as the line of text, the original line of text and the line of text are individually selectably viewable within the third version of the artifact; and
seventh program instructions programmed to display the line of text, as stored in the first version at the second notation in the second version including the revised line of text, and the original line of text, as stored in the original version at the third notation in the third version, at the revised line of text;
wherein:
the first notation is distinct from the second notation;
the first notation is related to the second notation in a comment chain; and
the original line of text and the line of text are individually selectably viewable within the second version.

16. The computer system of claim 15, wherein the program instructions further include:
   eighth program instructions programmed to associate the second notation with the first notation by a selectable link to the structured database proximate the revised line of text, the selectable link providing for access to at least the first notation and the line of text in the first version.

17. The computer system of claim 16, wherein:
displaying the line of text is performed responsive to selection of the selectable link.

18. The computer system of claim 15, wherein the program instructions further include:
   eighth program instructions programmed to generate a notation trail for the second version linked to the structured database; and
   wherein the first version is selectably viewable within the second version.

19. The computer system of claim 15, wherein the artifact is a binary executable file in a unified modeling language.

20. The computer system of claim 15, wherein the artifact is a physical piece of information that is used and/or produced by one of a software development process, a deployment of a system, and an operation of a system.

* * * * *